Dec. 21, 1948.　　　　E. F. ROSSMAN　　　　2,456,736
SHOCK ABSORBER
Filed Jan. 25, 1945

INVENTOR
EDWIN F. ROSSMAN
BY
Spencer, Hardman & Fehr
HIS ATTORNEYS

Patented Dec. 21, 1948

2,456,736

UNITED STATES PATENT OFFICE 2,456,736

SHOCK ABSORBER

Edwin F. Rossman, Dayton, Ohio, assignor to General Motors Corporation, Detroit, Mich., a corporation of Delaware Application January 25, 1945, Serial No. 574,522

10 Claims. (Cl. 188—88)

This invention relates to improvements in hydraulic shock absorbers adapted to control the approaching and separating movements of two relatively movable members.

It is among the objects of the present invention to provide an hydraulic shock absorber adapted initially to offer slight resistance to the movements of the members between which it is connected, but which at a predetermined point in the progressive movement of said members will offer a greater resistance thereto.

A further object of the present invention is to provide an hydraulic shock absorber with fluid pressure relief valves constructed and arranged in such a manner that quiet and smooth operation thereof will be effected.

Further objects and advantages of the present invention will be apparent from the following description, reference being had to the accompanying drawings wherein a preferred embodiment of the invention is clearly shown.

Figure 1:
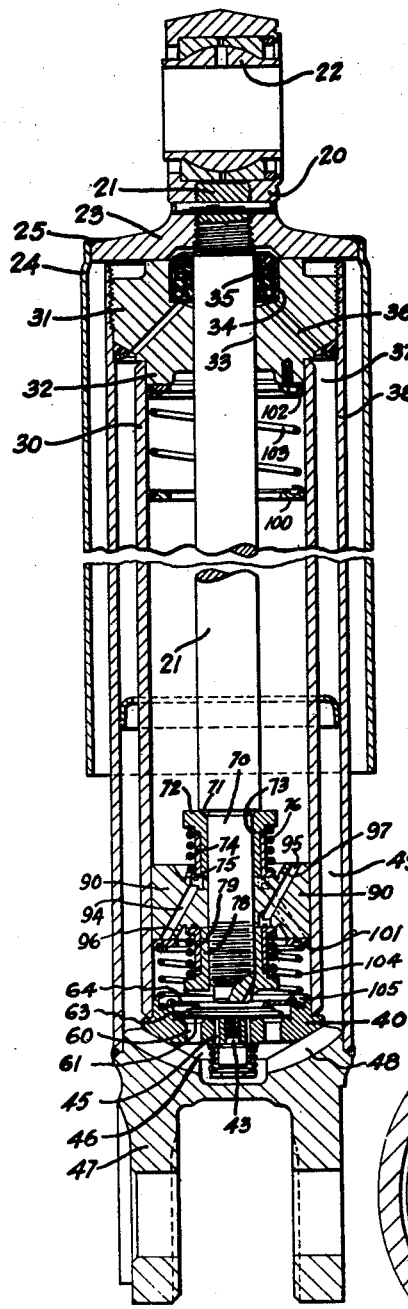
Fig. 1 is a longitudinal sectional view of the shock absorber.

Referring to the drawings, the numeral 20 designates a mounting member attached to the end of the piston rod 21 in any suitable manner. This mounting member 20 has a sleeve bearing 22 therein which receives a stud (not shown), which stud is secured to one of the relatively movable members, movement of which is to be controlled by the shock absorber. The mounting member 20 has an annular flange forming a disc 23 which fits into the open end of a tubular member 24 and is secured thereto as by welding indicated at 25. This tube 24 forms the dust cover for the shock absorber.

The numeral 30 designates a tubular member forming the working cylinder of the shock absorber. This cylinder is provided with a closure member at each end. The one closure member, designated by the numeral 31, has an annular lip portion 32 of such a diameter as to be directly received by the one end of the cylinder tube 30. Closure member 31 has a central opening 33 which slidably supports the piston rod 21 extending into the cylinder 30. An annular recess 34, coaxial of the opening 33 which slidably supports the piston rod 21, forms a receptacle for the packing gland assembly 35 which is designed to prevent fluid from leaking through the central opening 33 in the closure member to the outside of the shock absorber. The recess containing the packing 35 has a duct 36 leading therefrom into the annular space 37 formed between the tubular member 30 providing the working cylinder and a surrounding, substantially concentric tubular member 38, the one end of which is threaded to the closure member 31.

Figures 4, 5:
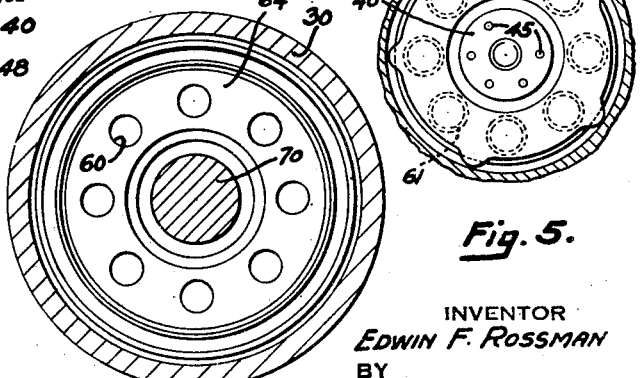
Fig. 4 is a detail sectional view of the one closure member of the cylinder. This view is taken along the line and in the direction 4—4 marked in the Fig. 2.
Fig. 5 is a detail sectional view taken along the line and in the direction 5—5 of Fig. 2.

The numeral 40 designates the closure member for the cylinder 30 opposite the closure member 31. This closure member 40 has an annular extension 41, the outer diameter of which is such as to be press-fitted into the lower end of the tube 30 forming the cylinder. A central opening in the closure member 40 is interiorly threaded to receive the threaded shank portion of the stud 43. About this threaded opening in the closure member 40, a plurality of openings 45 are arranged in a circular row, all excepting two adjacent openings being equally spaced, one from the other, as shown in the Fig. 5. There provide communication between the inner chamber of the cylinder 30 and a space 46 formed between the closure member 40 and the mounting member 47 upon which said closure member rests. Ducts 48 in the mounting member 47, adjacent the closure member 40, provide communication between the chamber 46 and the annular chamber 49 termed the "fluid reservoir" and formed between the tubular member 30 and the tube 38, the upper end of which, as has been described, fits and is secured about the outer portion of the upper closure member 31. the lower end of which fits about and is secured to the mounting member 47 as by welding, as indicated at 50. The mounting member 47, just referred to, is attachable to the other relatively movable member whose movement is adapted to be controlled by the shock absorber.

The openings 45 arranged in a circular row in the closure member 40 and all of which excepting two are equally spaced from each other, are normally closed by a sleeve valve 55 slidably supported by the stud 43 and yieldably urged into engagement with the lower surface of the closure member 40 by a spring 56 which is interposed between an outwardly extending flange 57 on said sleeve valve and a flange 58 on the stud 43.

Another series of openings designated by the numeral 60 is provided in the closure member 40 arranged in a circular row of greater diameter than the circular row of openings 45. These openings 60 are adapted to provide communication between the inside of the cylinder 30 and the chamber 46 beneath the closure member 40. Each opening 60 has an annular ridge 61 surrounding it, forming a group of annular valve seats upon which the ring-valve 62 is yieldably urged by a spring 63 interposed between the valve 62 and a perforated collar 64 secured to the closure member 40.

Figure 2:
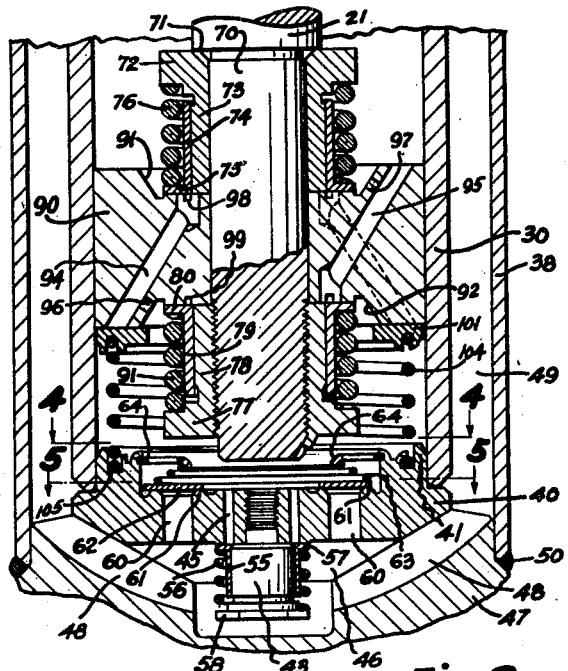
Fig. 2 is a detail sectional view on an enlarged scale. illustrating the lower end of the shock absorber and its piston.

Fig. 2 particularly shows the piston rod 21 having a reduced diameter portion 70 at its lower end for receiving and supporting the piston assembly. This reduced diameter portion 70 forms a shoulder 71 on the piston rod 21. A sleeve 72 fits over the reduced diameter 70 of the piston rod and abuts against the shoulder 71. This sleeve 72 has a reduced diameter portion 73 upon which the valve 74 is slidably carried. This valve 74 has an outwardly extending annular flange 75 which is yieldably urged into engagement with the adjacent end face of the piston 90 by a spring 76 interposed between the larger head portion of the sleeve 72 and the flange 75 of the valve 74. A similar sleeve 77 is threadedly received by the lower, threaded end of the reduced diameter shaft portion 70, the smaller diameter end of said sleeve 77 engaging the piston to clamp it tightly between sleeves 72 and 77 and thus hold the piston 90 rigidly in proper position upon the piston rod 21. This sleeve 77, like sleeve 72, has a reduced diameter portion 78 upon which the valve 79 is slidably carried, said valve having an outwardly extending annular flange 80 urged against the lower or adjacent end face of the piston by a spring 81 interposed between the flange 80 of the valve and the larger head portion of the sleeve 77.

The piston 90 is a cylindical block mounted on the shaft portion 70 and slidably fitting in the cylinder 30 so as to be reciprocative therein. Each end of the piston is centrally recessed, the recess at the upper end being designated by the numeral 91, the lower recess by the numeral 92. The bottom surface of recess 91 is engaged by the inner end of the reduced diameter portion 73 of sleeve 72 so that sleeve 72 may be said to be interposed between the shoulder 71 on the piston rod 21 and the bottom surface of the recess 91 in the piston 90. The bottom surface of the recess 92, in the other or lower end of the piston 90, is engaged by the inner end of the smaller diameter portion 78 of sleeve 77 and thus when sleeve 77 is tightly screwed upon the shaft portion 70 it presses the piston 90 against the sleeve 72 and it in turn against the shoulder 71 securely to hold the piston in proper position on the piston rod 21.

Figure 3:
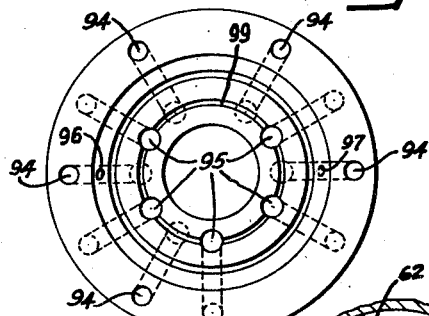
Fig. 3 is an end view of the piston.

The piston has a plurality of through passages to provide for the transfer of fluid from one side of the piston to the other. The Fig. 2 shows that these passages are oblique and cross, certain of said passages designated by the numeral 94 having adjacent end openings terminating in the flat surface of the bottom of the recess 91, the other ends of these certain passages opening in the flat surface at the bottom of the piston and adjacent the outer peripheral edge of the piston. As shown in Fig. 3 all of these certain passages 94 in the piston 90 are arranged in a circular row and all excepting two adjacent passages are equally spaced one from the other. All of the openings 94 in the top surface of the piston are partially covered by the inner end of the reduced diameter portion 73 of the sleeve 72. The other passages 95 are similarly arranged in a circular row in the piston and like passages 94 all adjacent ones excepting two are equally spaced.

One of the passages 94 has an orifice connection 96 between it and the recess 92, while a similar orifice 97 provides a constant communication between one of the passages 95 and the recess 91.

All of the openings of passages 94 in the upper end of the piston and arranged in a circular row directly beneath the valve 74 and restricted thereby are interconnected by a minimum fluid flow capacity annular groove 98 cut in the flat surface of the piston at the bottom of its recess 91. A similar, low fluid flow capacity annular groove 99 is provided in the bottom flat surface of the recess 92 in the lower end of the piston, providing an interconnecting duct between all of the openings of passages 95 arranged in a circular row in the bottom surface of recess 92 and covered by the valve 79. Both of these grooves 98 and 99 are of such size that they are of minimum fluid flow capacity, yet they provide for a temporary increase in fluid pressure initially exerted upon their respective spring loaded valves 74 and 79. As a respective valve is moved from its seat by fluid pressure, the groove will effect a thin, sheet-like spray of fluid to be established between the valve and its seat which tends to eliminate the "chuck-like" separating noise ofttimes present where a flat surface valve is moved by fluid pressure from its flat surface seat.

Quiet operation and elimination of vibrations of the valve are also effected by the spacing of the passage openings under the valve. As has been said the openings are arranged in a circular row and all but two adjacent openings are equally spaced one from another. This provides for an unbalanced pressure exerted against the valve tending to urge the valve open with a slight cocking tendency and thereby effecting a substantially progressive separation of the valve and valve seat.

In the Fig. 1, two ring valves 100 and 101 are shown, one in the cylinder pressure chamber on one side of the piston, the other in the pressure chamber on the opposite side of the piston. The Fig. 1 shows the piston at the bottom end of its compression stroke, in which position it will be moved when the two relatively movable members, between which said shock absorber is connected, reach their extreme approaching movement. Normally the piston is substantially midway between the closure members 31 and 40 of the shock absorber cylinder 30. Both ring valves 100 and 101 are normally held suspended in predetermined positions in the cylinder relatively to their respective closure members. The closure member 31 has a spring abutment member 102 secured thereto in which one end of a suspension spring 103 is secured. The other end of said spring is attached to the ring valve 100 and holds said ring valve yieldably in the proper position relatively to the closure member 31 and to the piston when it is in normal position in the cylinder. Likewise a spring 104 has its one end resting in a recess 105 in the end member 40, the other end of said spring being secured to the ring valve 101, normally holding said ring valve in its proper position relatively to the closure member 40 and the normally positioned piston 90 in the cylinder.

When the piston moves upwardly a predetermined distance due to the separating movement of the two relatively movable members between which it is connected, said piston will eventually engage ring valve 100 so that it will close openings 95 terminating in a circular row in the upper end of the piston adjacent the peripheral edge thereof. When, on the other hand, the piston is moved downwardly into the cylinder as illustrated, due to the approaching movement of the two relatively movable members between which said shock absorber is connected, the piston engages the lower ring valve 101 causing it to close the openings 94 terminating in a circular row in the lower surface of the piston 90 adjacent its peripheral edge. After engagement of the valve 101 by the piston 90, continued movement of the piston will compress the spring 104 as illustrated in Figs. 1 and 2, thereby maintaining the ends of passages 94 in the circular row closed. However, when these openings are closed by their respective ring valves 100 and 101, one passage of the affected passages will remain active due to the by-passing of fluid through the respective orifices 96 and 97.

The hydraulic shock absorber operates in the following manner:

As the relatively movable members between which the shock absorber is connected are moved to approach each other, the piston is actuated from its normal substantially intermediate position in the cylinder 30 toward the bottom thereof, exerting a pressure upon the fluid within the cylinder chamber between the piston 90 and the closure member 40. When the fluid pressure reaches a predetermined value, it being directed through the passages 94 open at their lower ends, it will be exerted upon the sleeve valve 74 which restricts the upper end of said passages, moving said sleeve valve against the effect of its spring 76 to establish a restricted flow of fluid from said passages 94 past the now open valve 74 into the cylinder chamber above the piston. As has been mentioned heretofore, the groove 98, which interconnects the passages 94 and is of such dimensions as to provide for a minimum fluid flow capacity, effects an increase in the fluid pressure initially exerted against the valve 74 which results in this lifting of the valve from its seat. The presence of the piston rod 21 in this chamber above the piston renders this chamber inadequate to receive all of the fluid displaced by the piston as it moves downwardly in the cylinder, for the cubical content of the upper chamber is substantially reduced by the presence of said piston rod; therefore a portion of the fluid displaced by the piston as it moves downwardly in the cylinder must be exhausted through the passages 45 in the closure member 40 against the spring loaded valve 55. Fluid pressure moves said valve against the effect of its spring 56 to establish a fluid flow from the lower cylinder pressure chamber beneath the piston through said openings 45 into the chamber 46 which, as has previously been described, communicates with the fluid reservoir 49 by the ducts 48 in the mounting member 47. The restriction to fluid flow from the lower cylinder pressure chamber both through the passages 94 and through the passages 45 causes the shock absorber to offer resistance of a certain degree to approaching movements of the two relatively movable members. This particular shock absorber is designed to provide a certain degree of resistance to the initial, approaching movements of said relatively movable members. However, when these relatively movable members reach a predetermined point in their approaching movement, it is desirable to increase the resistance particularly to slow up the approaching movement and prevent "bottoming".

In order to increase the resistance for a predetermined final range of approaching movement of the relatively movable members, the valve 101 is provided, which at a predetermined point in the movement of the piston downwardly, will engage said piston and completely shut all of the circularly arranged openings of passages 94 adjacent the circumferential edge of the piston. However, one of these passages 94 will remain effective inasmuch as fluid may flow from the pressure chamber beneath the piston through the constant orifice 96 into this one passage of the group 94, thus circumventing the valve 101. This substantial restriction to the flow of fluid from the lower pressure chamber greatly increases the resistance offered by the shock absorber to the approaching movements of the two relatively movable members, such resistance remaining as long as the valve 101 is engaged by piston 90.

As the movable members start to separate, the piston 90 will be moved upwardly and consequently fluid from the upper cylinder chamber having its pressure exerted through the passages 95 against the valve 79 will cause said valve to be moved from its seat to establish a restricted flow of fluid through passages 95 into the lower cylinder chamber beneath the piston 90. Naturally, the reduced cubical content of the upper cylinder chamber will not supply a sufficient amount of fluid to the lower chamber to fill it and consequently as the piston moves upwardly it will cause the valve 62 to be lifted from engagement with the closure member 40, thereby causing a replenishing supply of fluid to flow from the reservoir 49 through the ducts 48, chamber 46, through passages 60 in the closure member 40 and past the valve 62 into the lower cylinder chamber beneath the piston 90. The restriction to the fluid flow from the upper cylinder chamber through the piston passages 95 will be continued by valve 79 until the piston 90 engages the ring valve 100, at which point resistance to fluid flow will be increased inasmuch as all the passages 95, opening in a circular row adjacent the outer peripheral edge of the piston, will be closed by the ring valve 100. At this time only one fluid flow passage 95 will be effective, fluid from the upper fluid chamber flowing through the constant fluid flow orifice 97 through the one passage 95 and past the spring loaded valve 79 into the lower cylinder chamber. As long as valve 100 engages the piston 90 only this highly restricted fluid flow will be maintained thereby causing the shock absorber to offer maximum resistance to the final separating movements of the relatively movable members.

From the aforegoing description, it may be seen that applicant has provided an hydraulic shock absorber having valve mechanism which operates smoothly and quietly. The device provides initial resistance of a predetermined degree to the approaching or separating movements of the members between which it is connected. It is designed to provide a predetermined increase in its resistance to the movements of said members when they reach a predetermined point in their approaching or separating movements. This provides for a control of the movements of the relatively movable members at a predetermined degree within a certain range of intermediate movement and an increase in the resistance as to movement of said members approaching their extremes whereby extreme separations or sudden "bottoming" in their approaching movements, which tend to cause damage, is substantially eliminated.

While the embodiment of the present invention as herein disclosed, constitutes a preferred form, it is to be understood that other forms might be adopted, all coming within the scope of the claims which follow.

What is claimed is as follows:

1. An hydraulic shock absorber comprising in combination, a pressure cylinder; a piston slidably engaging the inner walls of said cylinder and comprising a solid body containing two sets of open ended passages, each set inclining from a large diameter circle on one side to a smaller diameter circle on the other side of said body, valves upon the sides mentioned of the body directly controlling the open ends of the passages at the smaller diameter circles, the open ends of the passages at the larger diameter circles being outside and always free of said valves; and a fluid metering groove of predetermined lesser fluid flow capacity than the passages in each end surface of said body, directly beneath each valve thereon so as to be covered by the valve, each groove interconnecting the open ends of the passages in each smaller diameter circle.

2. A device as disclosed in claim 1, in which, however, means are provided in the cylinder on each side of the piston and engageable by the piston as it is moved a predetermined distance in either direction for closing the open ends of the passages at the larger diameter circles respectively; and orifices of predetermined size, each leading from the respective side of the body to one passage of each of said sets of passages adjacent its open end at the larger diameter circle for circumventing the closure means where it engages the piston.

3. An hydraulic shock absorber comprising in combination, a cylinder; a fluid reservoir; an end member for said cylinder, having valved passages to provide communication between the cylinder and fluid reservoir; a piston in said cylinder, said piston having a plurality of through passages; a spring loaded valve urged upon each side of the piston and normally controlling certain of the piston passages; and a groove in each end of the piston, of lesser fluid flow capacity than any of the piston passages, and interconnecting all of the passages controlled by the spring loaded valve on the same end of the piston.

4. An hydraulic shock absorber, comprising in combination, a cylinder; a piston in said cylinder, said piston having diagonal and alternately crossed passages extending from one end surface of the piston to the other, the open ends of alternate passages being arranged in a smaller diameter circular row at one end of the piston than the open ends of the other passages; an annular groove of predeterminately lower fluid flow capacity than said passages in each end of the piston, each interconnecting all of the passage openings in the smaller diameter row; and a valve yieldably urged upon each side of the piston to control fluid flow from the row of interconnected openings.

5. An hydraulic shock absorber, comprising in combination, a fluid pressure cylinder; a piston in said cylinder, having two sets of open ended passages, each set inclining from a larger diameter circle on one side of the piston to a smaller diameter circle on the opposite side, all of the openings of each set of passages excepting two, being equally spaced, said two being a greater distance apart than the other openings of the respective set; a spring loaded valve yieldably urged upon each side of the piston and operative to control the openings in the smaller diameter circle in the respective piston side; and a minimum fluid flow capacity groove in each end surface of the piston, interconnecting all of the openings in the smaller diameter circle in the end of the piston.

6. An hydraulic shock absorber, comprising in combination, a fluid reservoir; a cylinder having a valved end member providing communication between the reservoir and cylinder; a piston in the cylinder, each end of the piston being centrally recessed causing each end of the piston to have two concentric and substantially parallel flat annular surfaces, at different levels; two sets of fluid flow passages, one set leading from the higher up level surface on one side of the piston and opening in the lower level surface of the recess on the opposite side of the piston, the other set leading from the higher level surface of the said opposite side of the piston into the bottom surface of the recess in the said one end of the piston; means yieldably urged upon each side of the piston to control fluid flow from the passage openings in the lower level surfaces thereof; and slots of lesser fluid flow capacity than the passages providing a pressure transmitting but flow restricting connection between all of said openings in each of the lower level surfaces.

7. An hydraulic shock absorber, comprising in combination, a fluid reservoir; a cylinder having one end member with valved ducts for providing communication between the reservoir and cylinder; a piston in the cylinder; a piston rod slidably extending through the other end member of the cylinder and having the piston secured thereto; two sleeves on the rod, one on each side of the piston for holding the piston in proper position on the rod; a central annular recess in each end of the piston thereby providing each piston end with two parallel, concentric annular flat surfaces at different levels; a plurality of fluid flow passages lengthwise through the piston, each passage connecting a high level surface on one side of the piston with a low level surface at the opposite side of the piston, the openings of the passages in each low level surface of the piston being partially restricted by the respective piston rod sleeve engaging said surface; an annular groove in each lower level surface on each side of the piston, and outside the confines of the engaging piston rod sleeve providing a pressure exerting and fluid flow restricting connecting means between all passages opening in said surface; and a spring loaded valve slidably carried by each piston rod sleeve, controlling the openings partially restricted by the respective sleeve and forming the closing side of the connecting groove in the surface of the piston engaged by the valve.

8. An hydraulic shock absorber, comprising in combination, a fluid reservoir; a cylinder having one end adapted to communicate with the reservoir; a reciprocative piston in the cylinder, said piston having a plurality of end to end through passages one group of which open in one side of the piston adjacent its peripheral edge and in the other side of the piston more adjacent its axis, the other group of the passages opening in said other side of the piston adjacent its peripheral edge and in the said one side of the piston more adjacent its axis; a spring loaded valve urged upon each side of the piston for controlling fluid flow through the group of passage openings more adjacent the axis of the piston; means interconnecting the passages of each group directly beneath their adjacent valve; a ring member yieldably supported adjacent each end of the cylinder and adapted to be engaged by the piston as it moves in one direction or the other, for closing the piston passages opening on the respective side of the piston adjacent its peripheral edge; and a fixed orifice leading from one side of the piston into one passage of each group of passages for circumventing the ring which closes the end of said passage and its group.

9. An hydraulic shock absorber, comprising in combination, a fluid reservoir; a cylinder having communicating means with said reservoir; a reciprocative piston in said cylinder and having two sets of fluid flow passages, one set crossing the other, the open ends of said passages being in circles of different diameter at the top and bottom sides of the piston; spring loaded valves on both sides of the piston for controlling fluid flow from the ends of the passages in the circles of smaller diameter; an annular channel in each end surface of the piston, covered by the engaging valve and connecting all of the openings beneath the said valve; a shut off ring-valve spring suspended at each end of the cylinder and predeterminately spaced from the piston when it is in its intermediate position in the cylinder for engaging the piston and closing the open ends of the passages in the circles of greater diameter; and an orifice of predetermined size leading from each side of the piston respectively to one passage of a set of passages for providing a constant circumventing fluid flow around the respective ring-valve as it closes the end opening of said passage.

10. An hydraulic shock absorber, comprising in combination, a cylinder having a valved end member communicating with a fluid reservoir; a piston in said cylinder, provided with a plurality of fluid flow passages therethrough; an actuator for reciprocating said piston; a ring spring suspended a predetermined distance from each end of the cylinder and adapted to be engaged by the piston as it reaches a predetermined point in its movement in either direction for closing the open ends of certain of the piston passages; a spring loaded valve on each side of the piston for controlling fluid flow from the ends of the passages in the piston not adapted to be closed by the ring in the cylinder at this side of the piston; an orifice in each end of the piston providing a constant communication between one of the passages closed at the same end by the ring and the cylinder chamber containing the respective ring; and a groove in each end of the piston providing a communicating duct between the piston passages directly beneath the spring loaded valve at the respective side of the piston.

EDWIN F. ROSSMAN.

REFERENCES CITED

The following references are of record in the file of this patent:

UNITED STATES PATENTS

| Number | Name | Date |
| --- | --- | --- |
| 2,316,924 | Whisler | Apr. 20, 1943 |
| 2,355,491 | Whisler | Aug. 8, 1944 |
| 2,379,750 | Rossman | July 23, 1945 |